United States Patent [19]
Collins, Jr. et al.

[11] Patent Number: 4,751,641
[45] Date of Patent: Jun. 14, 1988

[54] METHOD AND APPARATUS FOR STORING DATA TO FACILITATE PRICE LOOK-UP

[75] Inventors: Donald A. Collins, Jr.; Karl E. Dueland, both of Cambridge, Ohio

[73] Assignee: NCR Corporation, Dayton, Ohio

[21] Appl. No.: 945,051

[22] Filed: Dec. 22, 1986

[51] Int. Cl.⁴ .................................................. G06F 15/00
[52] U.S. Cl. ...................................................... 364/405
[58] Field of Search ............... 364/405, 404; 235/375, 235/383, 385

[56] References Cited

U.S. PATENT DOCUMENTS

| | | | |
|---|---|---|---|
| 4,500,880 | 2/1985 | Gomersall et al. | 364/464 X |
| 4,509,129 | 4/1985 | Yatsunami et al. | 364/405 X |
| 4,529,871 | 7/1985 | Davidson | 235/385 X |
| 4,597,045 | 6/1986 | Kiuchi | 364/406 |
| 4,661,908 | 4/1987 | Hamano et al. | 364/405 |
| 4,670,853 | 6/1987 | Stepien | 364/705 |
| 4,679,154 | 7/1987 | Blanford | 364/405 X |
| 4,685,702 | 8/1987 | Kazuharu | 235/375 X |
| 4,707,785 | 11/1987 | Takagi | 364/405 |

FOREIGN PATENT DOCUMENTS 1179782  12/1984  Canada ........................... 364/191

Primary Examiner—Jerry Smith
Assistant Examiner—Allen MacDonald
Attorney, Agent, or Firm—Wilbert Hawk, Jr.; Albert L. Sessler, Jr.; Elmer Wargo

[57] ABSTRACT

A method and apparatus for storing and retrieving data so as to facilitate performing a price look-up (PLU) function. A scanner and a retail terminal at a checkout counter are used in conjunction with a U.P.C. number on an article to be sold. An EPROM at the scanner is used to store a compressed article description which is stored by U.P.C. number. The EPROM address for a "matched" U.P.C. number is used to obtain the corresponding price data in a RAM located at the scanner itself, thereby reducing the time required to effect a PLU function.

7 Claims, 3 Drawing Sheets

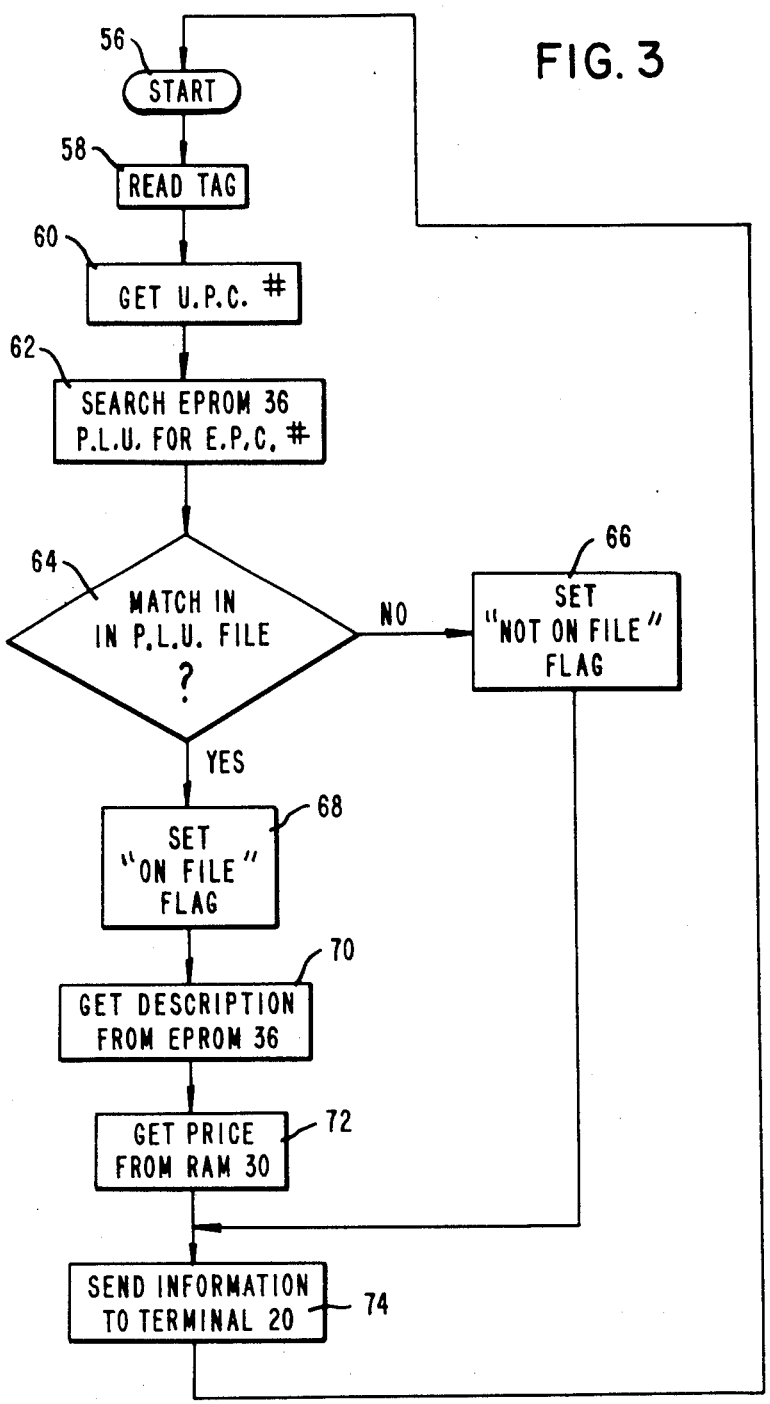

METHOD AND APPARATUS FOR STORING DATA TO FACILITATE PRICE LOOK-UP

BACKGROUND OF THE INVENTION

This invention relates to a method and apparatus for storing and retrieving data so as to facilitate performing a data look-up function, like a price look-up function, for example.

In recent years, there has been a trend to place U.P.C. (Universal Pricing Code) data on merchandise to be sold. When a customer presents the merchandise to be purchased at a checkout counter, an operator moves the merchandise so that the associated U.P.C. data thereon is moved in operative relationship with a scanning unit associated with a retail terminal at the checkout counter. The U.P.C. data which is read is used to electronically obtain (from a host processor) the associated unit price and merchandise description which are then printed on a sales slip by the retail terminal, for example.

In general, the unit price and merchandise or article description are stored in a RAM at the host processor, and the scanner is used to obtain the U.P.C. data or code. The U.P.C. code from the scanner is transferred via the retail terminal to the host processor which then examines its RAM to find a match by the U.P.C. code. The associated article description and price are then utilized by the retail terminal in a conventional way.

SUMMARY OF THE INVENTION

The method and apparatus of the present invention provide a fast, data look-up scheme when compared to the prior-art techniques previously mentioned.

Another feature is that the apparatus of this invention involves a small amount of hardware for the amount of records stored.

In one aspect, the method of the invention relates to a process for storing data to facilitate a data look-up function like a price look-up function, for example, for a plurality of articles with each article having an identification code of a fixed number of data bits and also having an article description associated with it, said identification code and said article description comprising an entry having a predetermined number of data bits for each said article; said process comprising the steps: (a) arranging said entries for said plurality of articles in numerical order by said identification codes; (b) writing said entries from said arranging step in an Eraseable Programmable Read Only Memory (EPROM) while maintaining said numerical order so that each said entry has an entry address in said EPROM; and (c) writing price data in a RAM for each said article at an address in said RAM which is related to the entry address in said EPROM for the associated said article.

In another aspect, the method of this invention relates to a machine process for providing a price look-up function for a plurality of articles with each article having an identification code of a fixed number of bytes and also having an article description associated with it, said identification code and said article description comprising an entry having a predetermined number of bytes for each said article, said process comprising the steps: (a) arranging said entries for said plurality of articles in numerical order by said identification codes; (b) writing said entries from said arranging step in an EPROM while maintaining said numerical order so that each said entry has an entry address in said EPROM; (c) writing price data in a RAM for each said article at an address which is related to the entry address in said EPROM for the associated article; (d) obtaining an identification code for an article whose article description and price data are to be determined; (e) searching said EPROM for a match of said identification code from said obtaining step; (f) utilizing the associated entry address of a said entry resulting from a said match from said searching step to obtain the associated said price data in said RAM; (g) forwarding the associated said article description and said price data to a utilization device.

In yet another aspect, the apparatus of this invention relates to a scanner for providing a price look-up function comprising: reading means for reading a U.P.C. code associated with an article; an EPROM having a plurality of entries therein, with each said entry having an EPROM address, a U.P.C. code, and an article description therein; said entries being arranged in numerical order by said U.P.C. codes; said U.P.C. code and article description for each said entry containing a first predetermined number of bytes of data; and each said EPROM address differing from an adjacent said EPROM address by said first predetermined number; a RAM having a plurality of price entries therein, with each said price entry being associated with one of said articles and having a RAM address associated therewith, each said price entry having a second predetermined number of bytes of data, and each said RAM address for a said price entry differing from an adjacent one of said RAM addresses by said second predetermined number; and control means for receiving a said U.P.C. code from said reading means, for searching for a match of said U.P.C. code with one of said U.P.C. codes in said EPROM, for reading the corresponding EPROM address associated with an entry for said match when found, for dividing said corresponding EPROM address by said first predetermined number to generate a quotient, for multiplying said quotient by said second predetermined number to generate a said RAM address for obtaining the associated price entry from said RAM, and also for forwarding the associated article description and associated price entry for said U.P.C. code read by said reading means to a utilization device.

The advantages mentioned, and others will be more readily understood in connection with the following description, claims and drawing.

BRIEF DESCRIPTION OF THE DRAWING

FIG. 3 shows one embodiment of the process for performing a price look-up function according to this invention.

DETAILED DESCRIPTION OF THE INVENTION

Figure 1:
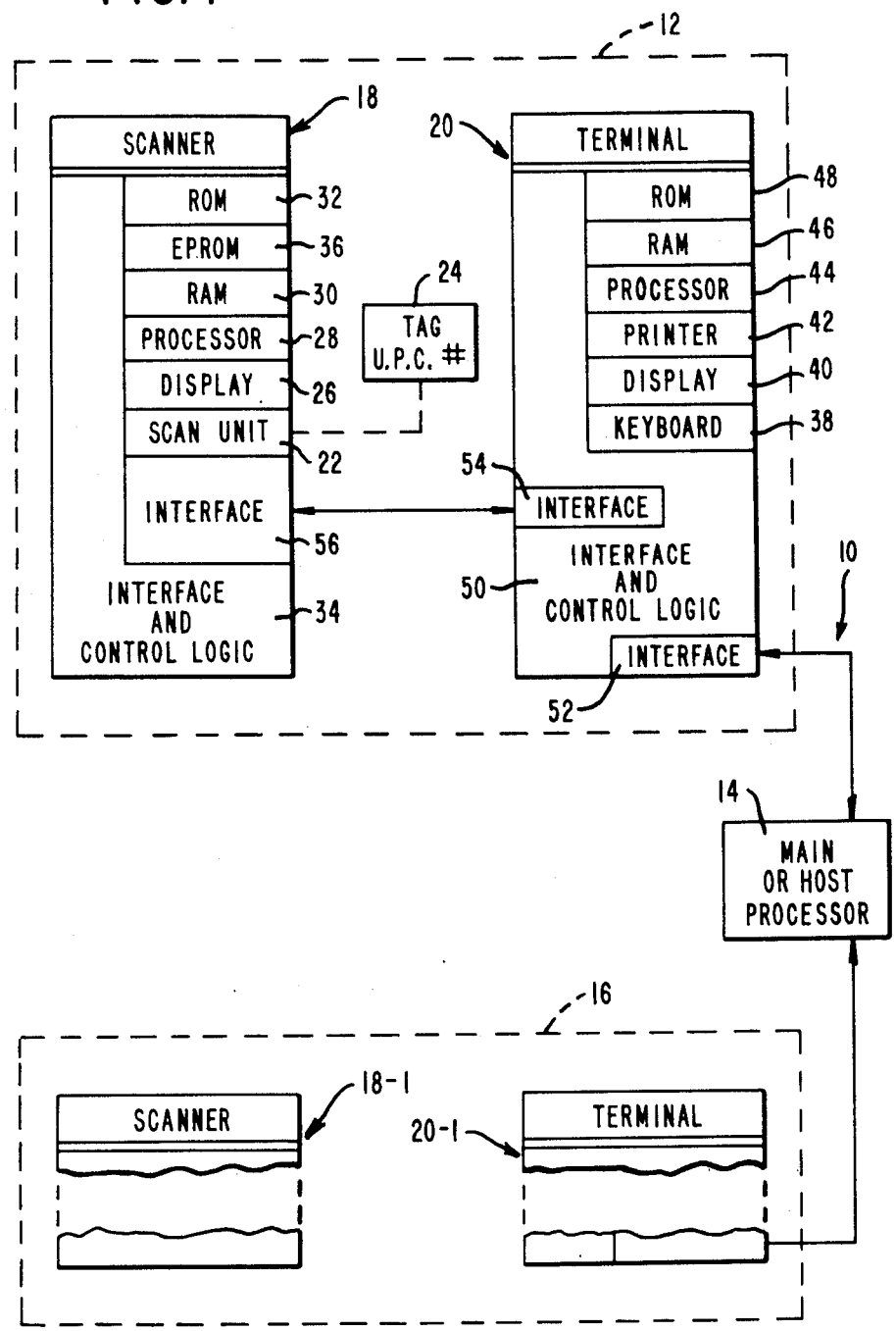
FIG. 1 is a schematic block diagram of a checkout counter which includes a scanner and a terminal which are connected to a host processor.

FIG. 1 shows an apparatus or system 10 in which this invention may be used. The system 10 includes a checkout counter shown in dashed outline 12 which is coupled to a main or host processor 14. There may be additional checkout counters, like 16, which are included in the system 10; however, it is not necessary to show them in complete detail for an understanding of this invention. The checkout counters 12 and 16 are frequently used in retail establishments like grocery stores, for example.

Each checkout counter, like 12, includes a scanner, designated generally as 18, and a retail terminal, like 20. In general, the function of the scanner 18 is to read a Universal Pricing Code (U.P.C.) associated with the merchandise to be sold, and the function of the retail terminal 20 is to perform the general functions which were performed by a "cash register". In addition, the terminal 20 is coupled to the host processor 14 to perform additional accounting functions.

In the embodiment described, the scanner 18 includes a scan unit 22 which reads the U.P.C. code printed on a container housing the merchandise to be sold or printed on a separate tag 24, for example. The scanner 18 also includes a display 26, a processor 28, a RAM 30, a ROM 32, and interface and control logic 34 which enable the scanner 18 to function as an intelligent terminal. The scanner 18 also includes an electrically, alterable, read only memory or EPROM 36 which is used in performing the price look-up function as will be described hereinafter.

The retail terminal 20 (FIG. 1) includes a keyboard 38, a display 40, a printer 42, processor 44, RAM 46, ROM 48 and interface and control logic 50 to enable it to function as an intelligent terminal. The terminal 20 also includes an interface 52 which couples it to the host processor 14, and it also includes an interface 54 which couples it to the scanner 18. The software or programs for running the terminal 20 may be stored in the ROM 48 or they may be loaded into the RAM 46 from the host processor 14, for example. Additional scanners like 18-1 which are identical to scanner 18, and additional retail terminals like 20-1, which are identical to retail terminal 20, may be included in the system 10. Terminal 20 communicates through its interface 54 to the scanner 18 via the interface 56 associated with the scanner 18.

In a prior art system, the scan unit 22 associated with the scanner 18 was used to obtain the U.P.C. code from the tag 24, and this data was forwarded via the terminal 20 to host processor 14 where the actual price look-up function was performed. The price and description for the merchandise associated with the tag 24 was then forwarded to the terminal 20 where it was displayed on the display 40 and the description of the merchandise was printed on a receipt by the printer 42. The description and price would be used by the terminal 20 for normal accounting functions. In some situations, the terminal 20 would forward the price to a display associated with the scanner where the customer would see the price of the merchandise being sold. The host processor 14 also performed accounting functions such as maintaining inventory totals of the articles associated with the U.P.C. codes.

In the present invention, the price look-up function is performed in the scanner 18 itself. This reduces the time taken for performing the price lookup function compared to prior art systems and methods.

There are two general elements to be obtained in a price look-up function. The first is the price and the second is the general description of the merchandise or article to be sold. In general, the description of the article remains relatively fixed while the price of the article may need to be changed to reflect changing economic conditions.

Accordingly, the system 10 utilizes an eraseable programmable read only memory (EPROM) 36 (FIG. 1) for storing the description of the articles to be sold and a RAM 30 for storing the associated price which may change often. A feature of this invention is that the price look-up function is performed at the scanner itself without having to forward the U.P.C. code to the terminal 20 as was previously done; this feature brings about a considerable reduction in time for performing the price look-up function. The U.P.C. code is forwarded to the host processor 14 to effect inventory control operations; however, the price look-up function is performed at the scanner 18 itself.

Figure 2:
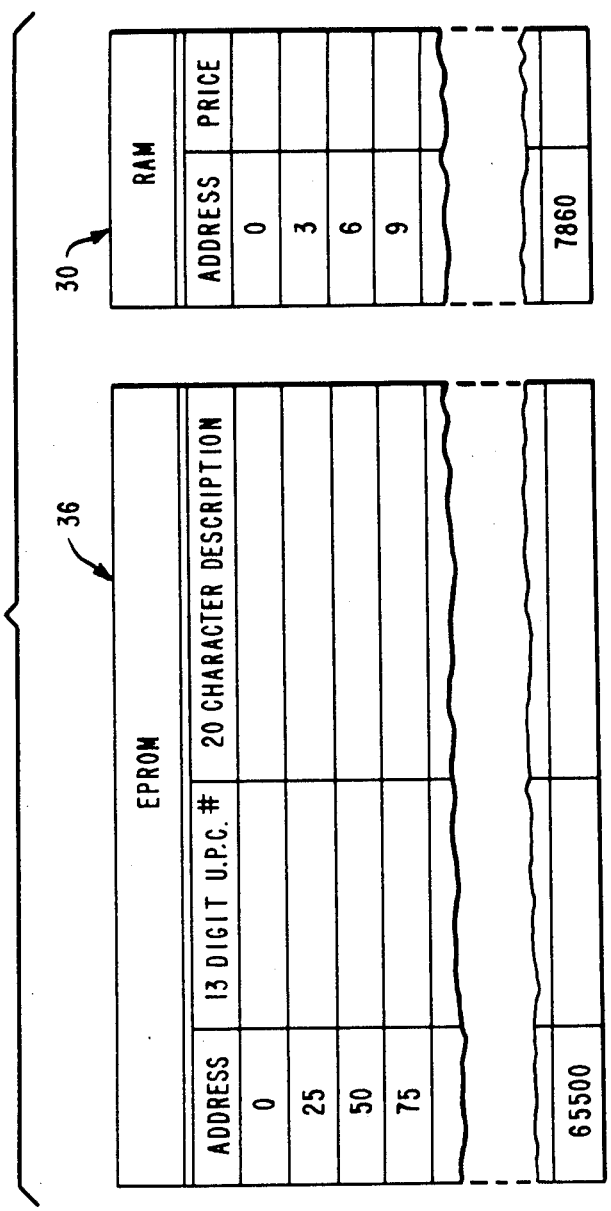
FIG. 2 shows the layout of data in an EPROM and a RAM used with the scanner shown in FIG. 1.

FIG. 2 shows the layout of the EPROM 36 and a portion of the RAM 30 used for performing the price look-up (PLU) function. In the embodiment described, each 13 digit U.P.C. code expected in the system 10 is stored in seven packed binary coded decimal (BCD) bytes of eight bits each. The 20 character description is stored in eighteen packed ASCII bytes. The packing is effected, basically, by not using the parity bit which is usually a part of an eight bit ASCII character. Accordingly, the U.P.C. code and the character description take a combined 25 bytes of space in the EPROM 36. The first or real address for the first entry in the EPROM 36 is zero, with each subsequent entry having an address which differs by 25 from the immediately prior address as shown in FIG. 2.

The portion of the RAM 30 shown in FIG. 2 contains the price data corresponding to each of the entries in the EPROM 36. The price data is stored in the RAM 30 in three packed BCD bytes, making available a price variation from $0.00 to $999.99 in the embodiment described. One nibble of the three packed BCD bytes is used as a special designator for application oriented purposes. For example, the nibble may be used to indicate a "price special" for the merchandise associated with the U.P.C. code. The correlation between entries in the RAM 30 and the EPROM 36 is effected by the following formula:

$$\text{Price address in } RAM\ 30 = \frac{(UPC\ \#\text{Addr. in } EPROM\ 36)}{25} \times 3$$

Notice from FIG. 2 that each address in the EPROM 36 differs from an adjacent address by a first predetermined number which is 25 in the embodiment described. Notice also that each address in RAM 30 differs from an adjacent address by a second predetermined number which is 3 in the embodiment described.

In arranging the data to be written into the EPROM 36, the U.P.C. code numbers are sorted in increasing numerical order and stored in a personal computer, for example, in the embodiment described, and thereafter, the data is conventionally written into the EPROM 36. Having the U.P.C. code numbers in numerical order facilitates accessing the data from the EPROM 36. For example, when a price look up (PLU) function is to be performed, the U.P.C. number from tag 24 is used to search for the U.P.C. number from the EPROM 36. This searching may be effected by a linear search by simply increasing the address by 25 in the embodiment described until a match is found. A preferred way of searching is to utilize a conventional binary search which is more efficient than the linear search mentioned. A binary search is effected, generally, by looking for a match at the mid point of a file. If no match occurs, the searching continues in either the first half or the second half of the file depending upon where the sought after data would logically be located. This process is repeated until a match is obtained for the sought after data. Once a match of U.P.C. number is found in the EPROM 36, the associated address for the corresponding price data in RAM 30 is found by utilizing the equation described earlier herein.

The process for performing a PLU function is shown in FIG. 3. Starting at step 56, an operator at the checkout counter 12 moves the tag 24 on an item to be sold in operative relationship with the scan unit 22 of the scanner 18 to read the tag 24 as shown at step 58. The U.P.C. code number is obtained from the tag 24, as shown at step 60, and this number is used to search the EPROM 36 for the U.P.C. number, as shown at step 62 and as previously described. At step 64, a decision is made. If there is no match of U.P.C. number in the EPROM 36, a "Not On File" flag is set as shown at step 66. This "Not On File" flag along with the U.P.C. number are then sent to the host processor 14 where the PLU function is handled for the associated U.P.C. number not on file.

If there is a match of a U.P.C. number in the EPROM 36 at step 64 in FIG. 3, an "On File" flag is set at step 68. Thereafter, the description of the matched U.P.C. number is obtained as shown at step 70, and the corresponding price is obtained from the RAM 30 as shown at step 72. The address in RAM 30 is obtained using the equation previously described. The description and the price obtained along with the U.P.C. number are then sent to the retail terminal 20, as at step 74, to complete the PLU function. If the particular scanner 18 used has a display, like 26, then the price would be sent to the display 26 concurrently with the complete data being sent to terminal 20.

In the embodiment described, the EPROM 36 has a capacity of 256K bytes and the portion of the RAM 30 used for the PLU function described herein is 32K bytes. With this arrangement, 10,485 records may be stored as described herein to provide the PLU function. With the system 10 described, the PLU function takes about one millisecond to perform. The U.P.C. number which is utilized by the scanner 18 is also simultaneously forwarded to the host processor 14 for the performance of the normal inventory tallies of items sold.

What is claimed is:

1. A machine process for storing data to facilitate a data look-up function for a plurality of articles with each article having an identification code of a fixed number of data bits and also having an article description associated with it, said identification code and said article description comprising an entry having a predetermined number of data bits for each said article; said process comprising the steps:
   (a) arranging said entries for said plurality of articles in numerical order by said identification codes;
   (b) writing said entries from said arranging step in an EPROM while maintaining said numerical order so that each said entry has an entry address in said EPROM; and
   (c) writing price data in a RAM for each said article at an address in said RAM which is related to the entry address in said EPROM for the associated said article.

2. A machine process for storing data to facilitate a price look-up function for a plurality of articles with each article having an identification code of a fixed number of bytes and also having an article description associated with it, said identification code and said article description comprising an entry having a first predetermined number of bytes for each said article, said process comprising the steps:
   (a) arranging said entries for said plurality of articles in increasing numerical order by said identification codes;
   (b) writing said entries from said arranging step in an EPROM while maintaining said increasing numerical order so that each said entry has an entry address in said EPROM, with each said entry address differing from an adjacent said entry address by said first predetermined number;
   (c) writing a price data entry in a RAM for each said article at a RAM address therein, each said price data entry having a second predetermined number of bytes, and each said RAM address for a price data entry differing from an adjacent one of said RAM addresses by said second predetermined number;
   said writing step for writing a price data entry at a RAM address in said RAM for an associated said article being effected by the steps:
   (d) dividing the entry address in said EPROM for a said article whose price data entry is to be written by said first predetermined number to obtain a quotient; and
   multiplying said quotient by said second predetermined number to obtain the associated RAM address.

3. A machine process for providing a price look-up function for a plurality of articles with each article having an identification code of a fixed number of bytes and also having an article description associated with it, said identification code and said article description comprising an entry having a predetermined number of bytes for each said article, said process comprising the steps:
   (a) arranging said entries for said plurality of articles in numerical order by said identification codes;
   (b) writing said entries from said arranging step in an EPROM while maintaining said numerical order so that each said entry has an entry address in said EPROM;
   (c) writing price data in a RAM for each said article at an address which is related to the entry address in said EPROM for the associated article;
   (d) obtaining an identification code for an article whose article description and price data are to be determined;
   (e) searching said EPROM for a match of said identification code from said obtaining step;
   (f) utilizing the associated entry address of a said entry resulting from a said match from said searching step to obtain the associated said price data in said RAM;
   (g) forwarding the associated said article description and said price data to a utilization device.

4. A machine process for storing and retrieving data to facilitate a price look-up function for a plurality of articles with each article having an identification code of a fixed number of data bytes and also having an article description associated with it, said identification code and said article description comprising an entry having a first predetermined number of data bytes for each said article, said storing of data comprising the steps:
   arranging said entries for said (a) arranging said entries for said plurality of articles in increasing numerical order by said identification codes;

(b) writing said entries from said arranging step in an EPROM while maintaining said increasing numerical order so that each said entry has an entry address in said EPROM, with each said entry address differing from an adjacent said entry address by said first predetermined number;

(c) writing a price data entry in a RAM for each said article at a RAM address therein, each said price data entry having a second predetermined number of bytes, and each said RAM address for a price data entry differing from an adjacent one of said RAM addresses by said second predetermined number;

said writing step for writing a price data entry at a RAM address in said RAM for an associated said article being effected by the steps:

(d) dividing the entry address in said EPROM for a said article whose price data entry is to be written by said first predetermined number to obtain a quotient;

multiplying said quotient by said second predetermined number to obtain the associated RAM address; and said retrieving of data comprising:

(e) obtaining an identification code for an article whose article description and price data from the associated price data entry are to be determined;

(f) searching said EPROM for a match of said identification code from said obtaining step;

(g) utilizing the associated entry address of a said entry resulting from a said match from said searching step to obtain the associated price data from said RAM;

said utilizing step being effected by:

(h) dividing the associated said entry address obtained from step g by said first predetermined number to obtain a quotient; and (i) multiplying said quotient from step h by said second predetermined number to obtain the associated RAM address;

(j) forwarding the associated article description found from said match in step f and the associated price data found at the said RAM address obtained in step i to a utilization device.

5. The machine process as claimed in claim 4 in which said identification code is a U.P.C. code and in which said arranging step is effected by (k) packing said U.P.C. code into seven packed BCD bytes and also packing said article description into eighteen packed ASCII bytes; and in which said writing step c is effected by:

(1) packing said price data entry into three packed BCD bytes.

6. A scanner for providing a price look-up function comprising:

reading means for reading a U.P.C. code associated with an article;

an EPROM having a plurality of entries therein, with each said entry having an EPROM address, a U.P.C. code, and an article description therein; said entries being arranged in numerical order by said U.P.C. codes;

said U.P.C. code and article description for each said entry containing a first predetermined number of bytes of data; and each said EPROM address differing from an adjacent said EPROM address by said first predetermined number;

a RAM having a plurality of price entries therein, with each said price entry being associated with one of said articles and having a RAM address associated therewith, each said price entry having a second predetermined number of bytes of data, and each said RAM address for a said price entry differing from an adjacent one of said RAM addresses by said second predetermined number; and control means for receiving a said U.P.C. code from said reading means, for searching for a match of said U.P.C. code with one of said U.P.C. codes in said EPROM, for reading the corresponding EPROM address associated with an entry for said match when found, for dividing said corresponding EPROM address by said first predetermined number to generate a quotient, for multiplying said quotient by said second predetermined number to generate a said RAM address for obtaining the associated price entry from said RAM, and also for forwarding the associated article description and associated price entry for said U.P.C. code read by said reading means to a utilization device.

7. The scanner as claimed in claim 6 in which each said U.P.C. code comprises seven packed BCD bytes, each said article description comprises eighteen packed ASCII bytes, and each said price entry comprises three packed BCD bytes.

* * * * *